US008582169B2

(12) United States Patent
Watanabe

(10) Patent No.: US 8,582,169 B2
(45) Date of Patent: Nov. 12, 2013

(54) PRINT CONTROLLING DEVICE FOR REDUCING THE EFFECTS OF PARTITIONS MARKS ON IMAGE QUALITY IN DIVISIONAL PRINTING

(75) Inventor: Kenichi Watanabe, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 419 days.

(21) Appl. No.: 13/024,410

(22) Filed: Feb. 10, 2011

(65) Prior Publication Data
US 2011/0242550 A1 Oct. 6, 2011

(30) Foreign Application Priority Data
Mar. 30, 2010 (JP) ................................ 2010-078502

(51) Int. Cl.
*G06K 15/02* (2006.01)
*H04N 1/393* (2006.01)

(52) U.S. Cl.
USPC ............................ 358/1.2; 358/1.18; 382/298

(58) Field of Classification Search
None
See application file for complete search history.

(56) References Cited

U.S. PATENT DOCUMENTS

| 6,690,482 B1* | 2/2004 | Toyoda et al. ................. 358/1.2 |
| 6,857,798 B2* | 2/2005 | Matsuyama ..................... 400/76 |
| 7,551,310 B2* | 6/2009 | Yudasaka et al. ............ 358/1.18 |
| 2003/0174346 A1* | 9/2003 | Nagatani ........................ 358/1.2 |
| 2003/0202211 A1 | 10/2003 | Yudasaka et al. |

FOREIGN PATENT DOCUMENTS

| JP | 05-143596 | 6/1993 |
| JP | 11-227287 | 8/1999 |
| JP | 2002-321422 | 11/2002 |

* cited by examiner

*Primary Examiner* — Gabriel I Garcia
*Assistant Examiner* — Pawandeep S Dhingra
(74) *Attorney, Agent, or Firm* — Banner & Witcoff, Ltd.

(57) ABSTRACT

A print controlling device includes an acquiring unit, a dividing unit, a first determining unit, and a print data generating unit. The acquiring unit acquires data representing an original image larger than a recording sheet. The dividing unit divides the original image data into image data that represent divisional images having a same size as the recording sheet. A border side has a partition line segments defined between image and margin regions of the divisional image. The original image consists of image regions of the divisional images. The image region represents part of the original image and has a colorant area to be printed with a colorant. The first determining unit determines, if the colorant area abuts a border side, whether a partition line segment abuts the colorant area based on the divisional image data. The print data generating unit generates print data by modifying the divisiona image data

13 Claims, 13 Drawing Sheets

PRINT CONTROLLING DEVICE FOR REDUCING THE EFFECTS OF PARTITIONS MARKS ON IMAGE QUALITY IN DIVISIONAL PRINTING

CROSS REFERENCE TO RELATED APPLICATION

This application claims priority from Japanese Patent Application No. 2010-078502 filed Mar. 30, 2010. The entire content of the priority application is incorporated herein by reference.

TECHNICAL FIELD

The present invention relates to a print controlling device.

BACKGROUND

A conventional technology called divisional printing or poster printing is known in the art as a technique for dividing an image of a size greater than the size of sheets used in a printing device and printing the image divisions on a plurality of sheets, which are subsequently pieced together to produce the original image. Some printing devices that employ this technology print partition lines on the sheets around the printed images to indicate the border between the printing region and the margins. The user then trims off the margins of the sheets using the printed partition lines as guides and/or overlaps and bonds the sheets together using the margins as adhesive regions, thereby joining all of the sheets to form a large printed material.

SUMMARY

However, sometimes the appearance of the printed material produced with the conventional technology suffers because the partition lines are still visible at the borders between sheets after the sheets are pieced together. The appearance of images printed with the conventional technology is particularly affected by partition lines when the partition lines are printed over the top of colorant images (regions of the overall printed image in which colorant is applied) when the colorant images span a plurality of sheets.

In view of the foregoing, it is an object of the present invention to provide a print controlling device that improves the conventional technology by reducing the adverse effects of partitions marks on image quality in divisional printing.

In order to attain the above and other objects, the invention provides a print controlling device including an acquiring unit, a dividing unit, a first determining unit, and a print data generating unit. The acquiring unit is configured to acquire original image data representing an original image having a size larger than a size of a recording sheet. The dividing unit is configured to divide the original image data into a plurality of sets of divisional image data that represents a plurality of divisional images. Each divisional image has a size same as the size of recording sheet. Each divisional image includes an image region and a margin region that is different from the image region. At least one border side is defined as a border between the image region and the margin region. Each border side has at least one partition line segments. The image region represents a part of original image. The original image consists of the image regions of the plurality divisional images. The image region has a colorant area to be printed with a colorant by a printing device and a blank area that is different from the colorant area. The first determining unit is configured to determine, if the colorant area abuts a border side of the at least one border side, whether or not a partition line segment of the at least one partition line segment abuts the colorant area in the divisional image based on the divisional image data. The print data generating unit is configured to generate print data by modifying each set of divisional image data. The print data represents a print image that is to be printed on the recording sheet by the printing device. The print data generating unit modifies, when the first determining unit determines that the partition line segment abuts the colorant area, the divisional image data such that at least part of the partition line segment is omitted in the print image. The print data generating unit modifies, if the colorant area does not abut a border side of the at least one border side, the divisional image data such that the at least one partition line segment is printed on the border side in the print image.

According to another aspect, the present invention provides a method executed by a print controlling device, the method including: acquiring original image data representing an original image, the original image having a size larger than a size of a recording sheet; dividing the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by a printing device; determining, when the colorant area abuts a border side of the at least one border side, whether or not a partition line segment of the at least one partition line segment abuts the colorant area in the divisional image based on the divisional image data; and generating print data by modifying each set of divisional image data, the print data representing a print image that is to be printed on the recording sheet by the printing device, wherein when the partition line segment abuts the colorant area, the generating modifies the divisional image data such that at least part of the partition line segment is omitted in the print image, and wherein when the colorant area does not abut a border side of the at least one border side, the generating modifies the divisional image data such that the at least one partition line segment is printed on the border side in the print image.

According to another aspect, the present invention provides a non-transitory computer readable storage medium storing a set of program instructions installed on and executed by a computer for controlling a print controlling device, the program instructions including: acquiring original image data representing an original image, the original image having a size larger than a size of a recording sheet; dividing the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by a printing device; determining, when the colorant area abuts a border side of the at least one border side, whether or not a partition line segment of the at least one partition line segment abuts the colorant area in the divisional image based on the divisional image data; and generating print data by modifying each set of divisional image data, the print data representing a print image that is to be printed on the recording sheet by the printing device, wherein when the partition line segment abuts the colorant area, the generating modifies the divisional image data such that at least part of the partition line segment is omitted in the print image, and wherein when the colorant area does not abut a border side of the at least one border side, the generating modifies the divisional image data such that the at least one partition line segment is printed on the border side in the print image.

According to another aspect, the present invention provides a print controlling system includes a printing device and a print controlling device. The printing device is configured to print an print image on a recording sheet. The print controlling device includes an acquiring unit and a dividing unit. The acquiring unit is configured to acquire original image data representing an original image, the original image having a size larger than a size of the recording sheet. The dividing unit is configured to divide the original image data into a plurality of sets of divisional image data. The plurality of sets of divisional image data represents a plurality of divisional images. Each divisional image has a size same as the size of recording sheet. Each divisional image includes an image region and a margin region that is different from the image region. At least one border side is defined as a border between the image region and the margin region. Each border side has at least one partition line segments. The image region represents a part of original image. The original image consists of the image regions of the plurality divisional images. The image region has a colorant area to be printed with a colorant by the printing device and a blank area that is different from the colorant area. One of the printing device and the print controlling unit further includes a first determining unit and a print data generating unit. The first determining unit is configured to determine, if the colorant area abuts a border side of the at least one border side, whether or not a partition line segment of the at least one partition line segment abuts the colorant area in the divisional image based on the divisional image data. The print data generating unit is configured to generate print data by modifying each set of divisional image data, the print data representing a print image that is to be printed on the recording sheet by the printing device. The print data generating unit modifies, when the first determining unit determines that the partition line segment abuts the colorant area, the divisional image data such that at least part of the partition line segment is omitted in the print image. The print data generating unit modifies, if the colorant area does not abut a border side of the at least one border side, the divisional image data such that the at least one partition line segment is printed on the border side in the print image. The printing device prints the print image based on the print data.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
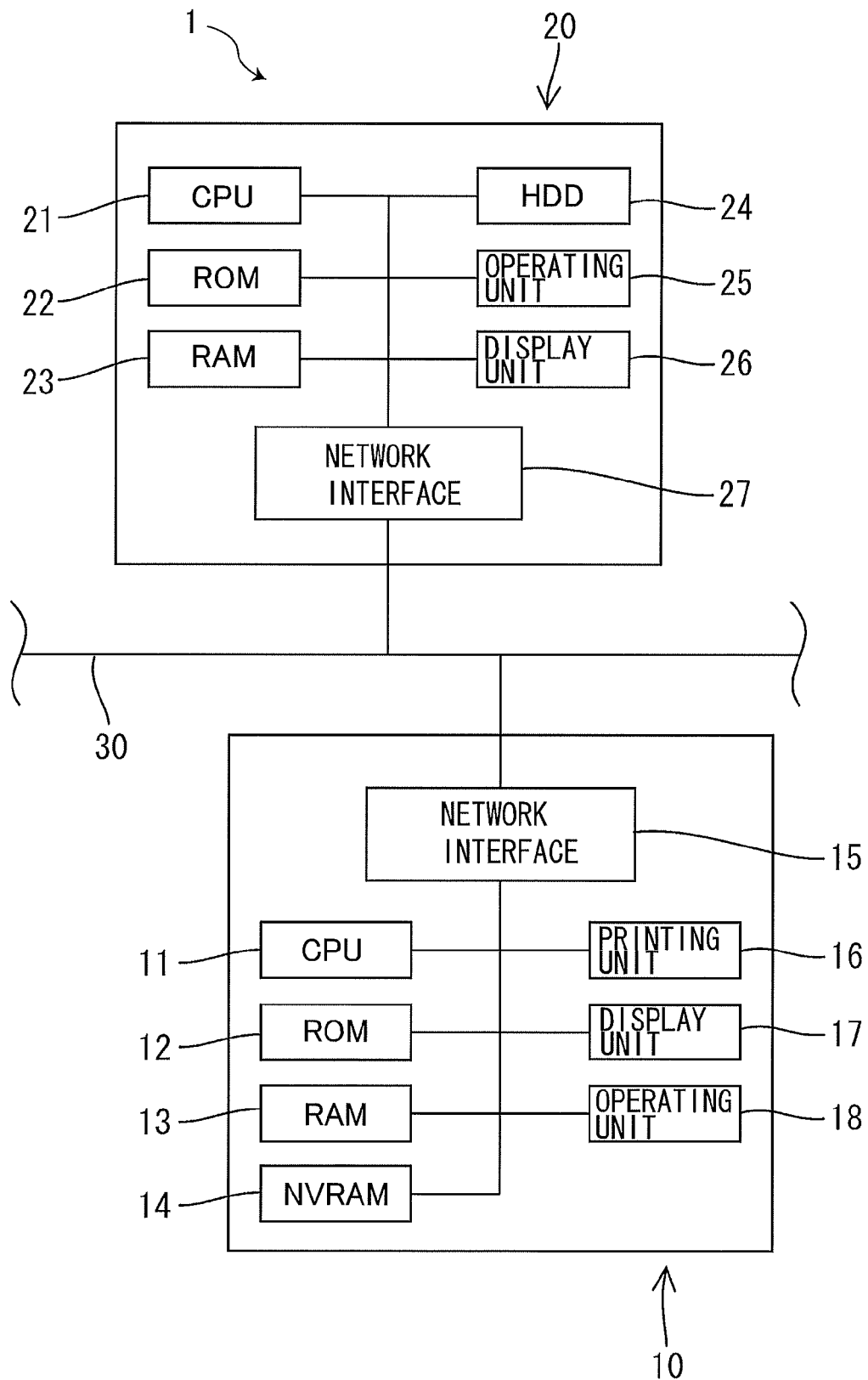
FIG. 1 is a block diagram showing a print controlling system including a printing device and a print controlling unit according to a first embodiment of the invention.

Next, a first embodiment of the present invention will be described while referring to FIGS. 1-5. As shown in FIG. 1, a print controlling system 1 includes a printer 10 and a computer 20 that connects to the printer 10 via a network.

The printer 10 includes a CPU 11, a ROM 12, a RAM 13, a NVRAM (nonvolatile memory) 14, a network interface 15, a printing unit 16, a display unit 17, and a operating unit 18. The ROM 12 stores various programs for executing various operations of the printer 10. The CPU 11 performs overall control of each component based on the programs read from the ROM 12 and stores processing results in the RAM 13 or the NVRAM 14. The network interface 15 is connected to the external computer 20 via a communication line 30 (LAN) such that the printer 10 and the computer 20 can perform a mutual data communication.

The printing unit 16 prints images on a recording sheet (recording paper, plastic sheet, and the like) in an electric graphic method and an inkjet method by using colorant (toner, inks, and the like) for single color or multiple colors. The display unit 17 includes a display and lamps and is configured to display various setting screen and operating states of the printer 20. The operating unit 18 includes various operating buttons and allows a user to input instructions through external operations.

The computer 20 includes a CPU 21, a ROM 22, and a RAM 23, a hard disk drive (HDD) 24, an operating unit 25 having a keyboard and a pointing device, a display unit 26 having a display, and a network interface 27 connected to the communication line 30. The hard disk drive 24 stores various programs such as application software for generating image data for printing and a printer driver for controlling operations of the printer 10.

When the user of the computer 20 inputs an instruction on the operating unit 25 to modify print settings, the CPU 21 of the computer 20 launches a user interface function included in the printer driver for modifying print settings. This function displays a print settings window (not shown) on the display unit 26. By performing input in this window, the user can set various printing conditions. Printing conditions that the user can modify may include an option for performing divisional printing, and settings for the numbers of sheets arranged vertically and horizontally when performing divisional printing. After the user has modified the print settings and has inputted an instruction on the operating unit 25 to execute a printing operation, the CPU 21 performs a print data generation/transmission process shown in FIG. 2.

Figure 2:
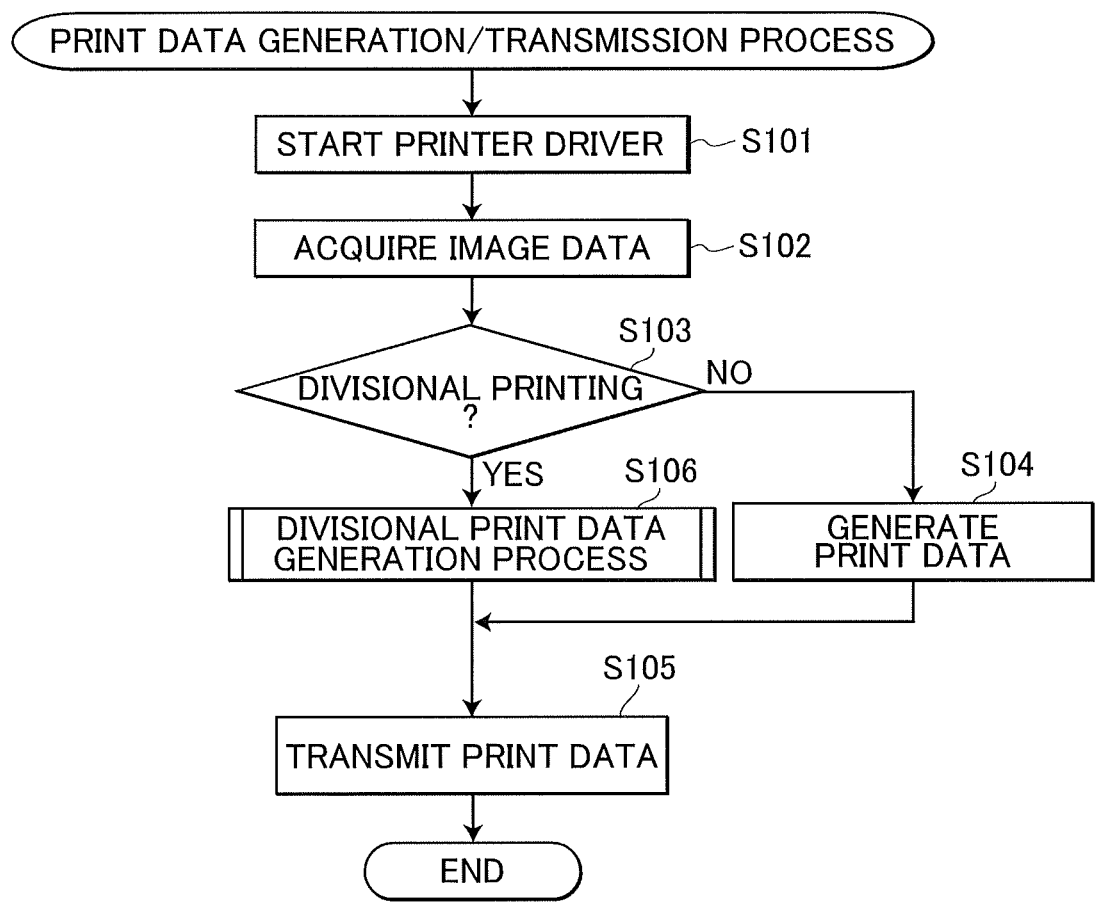
FIG. 2 is a flowchart illustrating steps in a print data generation/transmission process.

As shown in FIG. 2, in S101 at the beginning of the print data generation/transmission process, the CPU 21 starts a print data generation function possessed by the printer driver. In S102 the CPU 21 acquires original image data to be printed from an application that handles documents, images, or the like. In S103 the CPU 21 determines whether or not the user has selected the divisional printing option in the print settings. If the divisional printing option has not been selected (S103: NO), in S104 the CPU 21 generates print data by converting the original image data to a page description language (PDL) or the like based on the print settings.

In S105 the CPU 21 transmits the print data generated in S104 to the printer 10 via the network interface 27, and subsequently ends the current print data generation/transmission process. Upon receiving this print data via the network interface 15, the CPU 11 of the printer 10 prints a print image on a sheet based on the print data.

However, if the CPU 21 determines in S103 that the divisional printing option was selected (S103: YES), in S106 the CPU 21 executes a divisional print data generation process shown in FIG. 3.

Figure 3:
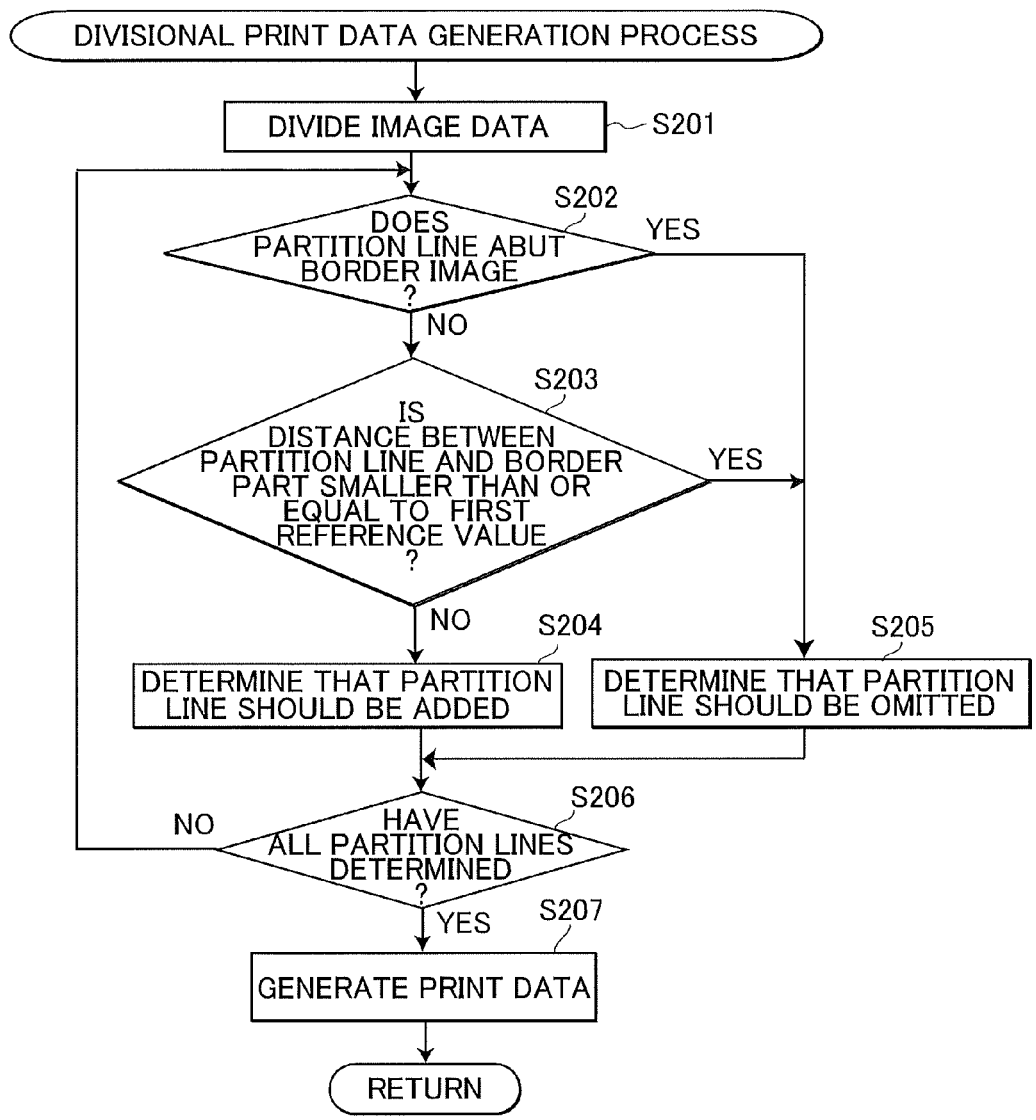
FIG. 3 is a flowchart illustrating steps in a divisional print data generation process of the print data generation/transmission process shown in FIG. 2 according to the first embodiment.

As shown in FIG. 3, in S201 at the beginning of this divisional print data generation process, the CPU 21 divides the original image data acquired in S102 among a specified number of sheets.

Figure 4:
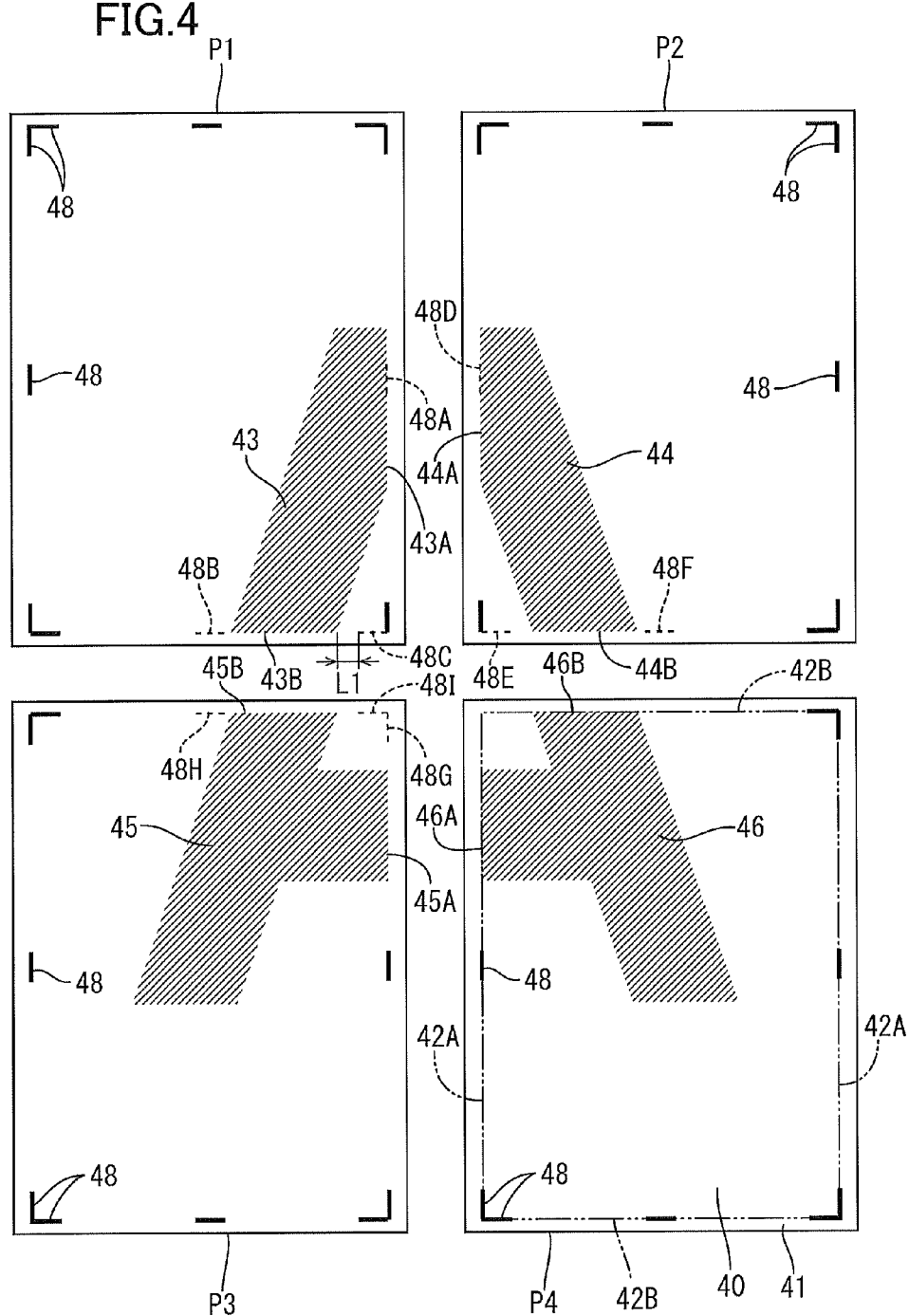
FIG. 4 is an explanatory diagram showing a plurality of print images printed by the printing device in the first embodiment.

FIG. 4 illustrates a sample divisional printing operation in which a single original image including a graphical image of the letter "A" is divided among a total of four sheets P1-P4 arranged two vertically by two horizontally. In FIG. 4, the two-dot chain line on sheet P4 denotes the border between a printing region 40 and a peripheral margin region 41. This border is configured of a total of four border sides 42A and 42B, and specifically two long sides 42A and two short sides 42B. Note that the two-dot chain line indicated on sheet P4 is not printed. Although not indicated in FIG. 4, the border sides 42A and 42B exist at the same positions on the other sheets P1-P3.

The original image data divided in S201 of FIG. 3 is printed in the printing regions 40 of the respective sheets P1-P4. The original graphical image of the letter "A" is divided into four image parts 43, 44, 45, and 46 (indicated by hatching lines in FIG. 4) that are areas to be colored with a colorant (hereinafter referred to as "colorant areas") when the divisional images is printed on the sheets P1-P4. Each of the image parts 43, 44, 45, and 46 abut respective border sides 42A and 42B.

Thus, colorant areas (colored images) that abut border sides in the divisional images represented by the divided image data will be called "border images," and the parts of these border images touching these border sides will be called "border parts." In this example, the border image 43 includes a border part 43A that abuts a long side 42A of sheet P1, and a border part 43B that abuts a short side 42B. Similarly, the border images 44, 45, and 46 have respective border parts 44A, 45A, and 46A that abut corresponding long sides 42A, and respective border parts 44B, 45B, and 46B that abut corresponding short sides 42B.

The CPU 21 performs a process to determine whether to provide partition lines along the border sides 42A and 42B of the sheets P1-P4 for indicating the positions of these border sides 42A and 42B. In the first embodiment, partition lines are line segments of a prescribed length that are only provided at specified positions based on the size of the sheet and the like. These specified positions are positions for providing partition lines when no border image is present on the border side. In the first embodiment, three specified positions are available for each border side: both ends of each border side, and the center of each border side. For example, since a border image does not abut the border sides 42A and 42B on the left and top sides of sheet P1, partition lines 48 are provided at both ends and the center of these border sides 42A and 42B.

After completing the process in S201, the CPU 21 determines in S202 for one of the assigned partition lines whether the partition line is at a position abutting a border image (colorant area of the divisional image). In other words, when the partition line is assigned to a specified position, the CPU 21 determines whether this partition line abuts the border part of a border image. If the partition line does not abut a border image (S202: NO), in S203 the CPU 21 determines whether or not a distance between the partition line and the border part on the same border side (specifically, the portion of the border part on the same border side nearest the partition line) is within a prescribed first reference value. In other words, in S203 the CPU 21 determines whether or not a distance between the partition line segment and the colorant area in the divisional image is smaller than or equal to the first reference value.

If the CPU 21 determines that the distance between the partition line and the border part is greater than the first reference value (S203: NO), in S204 the CPU 21 determines that the partition line should be provided at the specified position.

Further, when the CPU 21 determines in S202 that the partition line abuts a border image (S202: YES), in S205 the CPU 21 determines that the partition line should be omitted rather than provided at the specified position. Alternatively, if the CPU 21 determines in S202 that the partition line does not abut a border image (S202: NO) but determines that the distance between the partition line and the border part along the border side is within the first reference value (S203: YES), then in S205 the CPU 21 determines that the partition line should be omitted.

Using the example of sheet P1 in FIG. 4, a partition line 48A positioned in the right center of sheet P1 is omitted because the partition line abuts the border image 43. A partition line 48C positioned in the right edge on the bottom side is also omitted because a distance L1 between the partition line 48C and the border part 43B on the same short side 42B is within the first reference value. A partition line 48B positioned in the center of the bottom side is also omitted for the same reason given for the partition line 48C.

After determining whether to provide or omit one partition line in this way, in S206 the CPU 21 determines whether another partition line exists. If there remain other partition lines for which the above determination has not yet been made (S206: YES), the CPU 21 returns to S202 and determines whether to provide or omit the next partition line. After completing the above determination for all partition lines on each sheet (S206: NO), in S207 the CPU 21 generates print data by modifying the divisional image data. At this time, the CPU 21 adds data for partition lines to the image data divided among all sheets at positions that the CPU 21 determined partition lines should be provided. More specifically, when CPU 21 determines that the partition line abuts the colorant area in S202, the CPU 21 modifies the divisional image data such that at least part of the partition line segment is omitted in the print image. Further, when the CPU 21 determines that the partition line does not abut the colorant area in S202 and when the CPU 21 determines that the distance between the partition line and the border images is smaller than or equal to the first reference value in S203, the CPU 21 unit modifies the divisional image data such that at least part of the partition line segment is omitted on the border side in the print image. Further, when the colorant area does not abut the border side, the CPU 21 modifies the divisional image data such that the partition line segment is printed on the border side in the print image. The CPU 21 converts this data to a PDL format or the like and generates print data for each sheet. The processes for assigning partition lines and for omitting partition lines are implemented through steps S202-S207 described above.

Subsequently, the CPU 21 ends the divisional print data generation process and returns to the process in FIG. 2. In S105 of FIG. 2, the CPU 21 transmits the print data generated above to the printer 10. As a result, the printer 10 prints print images in which included partition lines 48 are added to sheets P1-P4 and excluded partition lines 48A-48I are not.

In the example shown in FIG. 4, the partition line 48A abutting the border image 43 in the center of the right side of sheet P1 has been omitted. However, the user can still discern the position of the long side 42A on the right side of sheet P1 from the position of the border part 43A of the border image 43 and the position of the partition lines 48 provided on the same long side 42A. Further, the two partition lines 48A and 48C positioned close to (within the first reference value of) the border part 43B on the bottom edge of the border image 43 have been omitted from sheet P1. However, the user can still discern the position of the short side 42B on the bottom side of sheet P1 from the position of the border part 43B and the position of the partition line 48 provided on the same short side 42B.

Similarly, partition lines 48D-48I have been omitted from portions of the other sheets P2-P4 (the omitted partition lines for sheet P4 are not indicated in FIG. 4). However, the user can easily discern the positions of the corresponding border sides 42A and 42B from the positions of the border parts 44A, 44B, 45A, 45B, 46A, and 46B of the respective border images 44-46, even when the partition lines 48D-48I are omitted.

Figure 5:
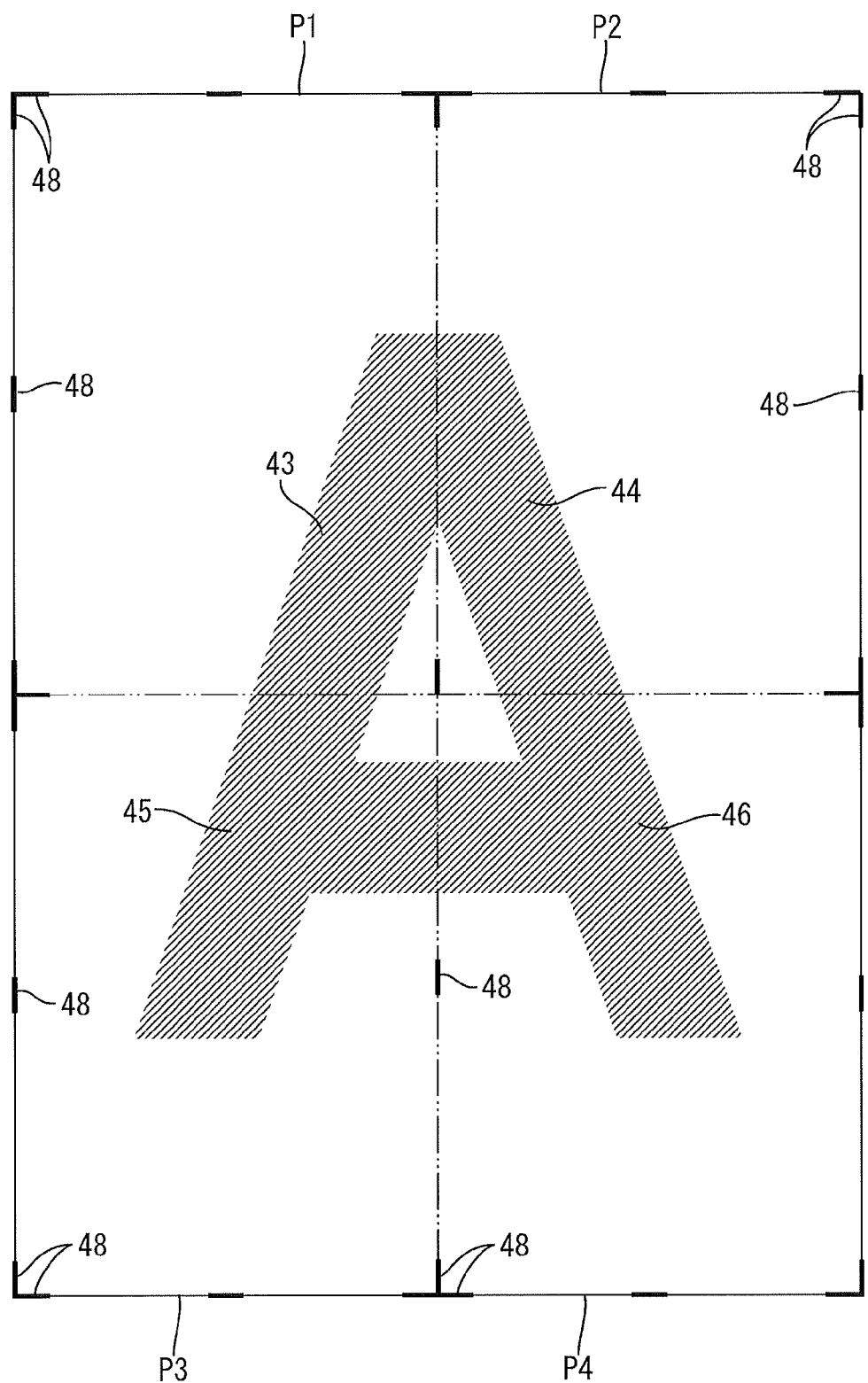
FIG. 5 is an explanatory diagram showing an original image by piecing together the print images shown in FIG. 4.

The user can trim off the margin regions 41 from the sheets P1-P4 by placing a ruler along the border parts of the border images 43, 44, 45, and 46 and the corresponding partition lines 48 provided on sheets P1-P4 and cutting along the border sides 42A and 42B with a cutting blade or the like. By subsequently piecing together the sheets P1-P4 using tape or the like, the user can obtain a single printed material of a large size, as shown in FIG. 5. Alternatively, some of the margin regions 41 may be left uncut and used as adhesive margins for bonding the sheets P1-P4 together by overlapping each margin region 41 with one of the other sheets P1-P4. In this case, the user can position the sheets P1-P4 by aligning edges of the sheets P1-P4 with the border parts of the border images 43, 44, 45, and 46 and the partition lines 48.

As shown in FIG. 5, since the partition lines 48A and 48D abutting the border images 43 and 44 are omitted and not printed over the border images 43 and 44, the resulting printed material obtained by piecing together the sheets P1-P4 has a better appearance than when the partition lines 48A and 48D are added. Further, since the partition lines 48B, 48C, 48E, 48F, 48G, 48H, and 48I at positions close to the border parts 43B, 44B, 45A, 45B, 46A, and 46B have been omitted and, hence, are not printed at positions relatively close to the border images 43-46, the appearance of the printed material is better than when these partition lines are added.

In the first embodiment described above, partition lines at positions abutting border images are omitted, reducing the adverse effects that such partition lines have on the appearance of the printed material. Further, the user can discern the positions of border sides from the border images themselves, even when the partition lines abutting the border images are omitted.

The adverse effects of partition lines on the appearance of the printed material can also be reduced by omitting at least some of the partition lines that do not abut the border images but fall on the border sides abutting the border images. The user can still discern the positions of border sides based on the border images themselves, even when some of the partition lines not abutting the border images have been omitted.

When the distance between a partition line and a border part of a border image along one border side is relatively small, it is likely that the user can readily discern the position of the border side from the border image itself, without the need of the partition line. Hence, the adverse effects of such partition lines on the appearance of the printed material can be reduced by omitting partition lines that fall within a reference distance from the border part of the border image.

Next, a second embodiment of the present invention will be described with reference to FIGS. 6 and 7. In the second through fifth embodiments described below, the structure of the print controlling system and the operations of the system in the print data generation/transmission process are identical to those described in the first embodiment. Therefore, a description of this construction and these operations will not be repeated.

Figure 6:
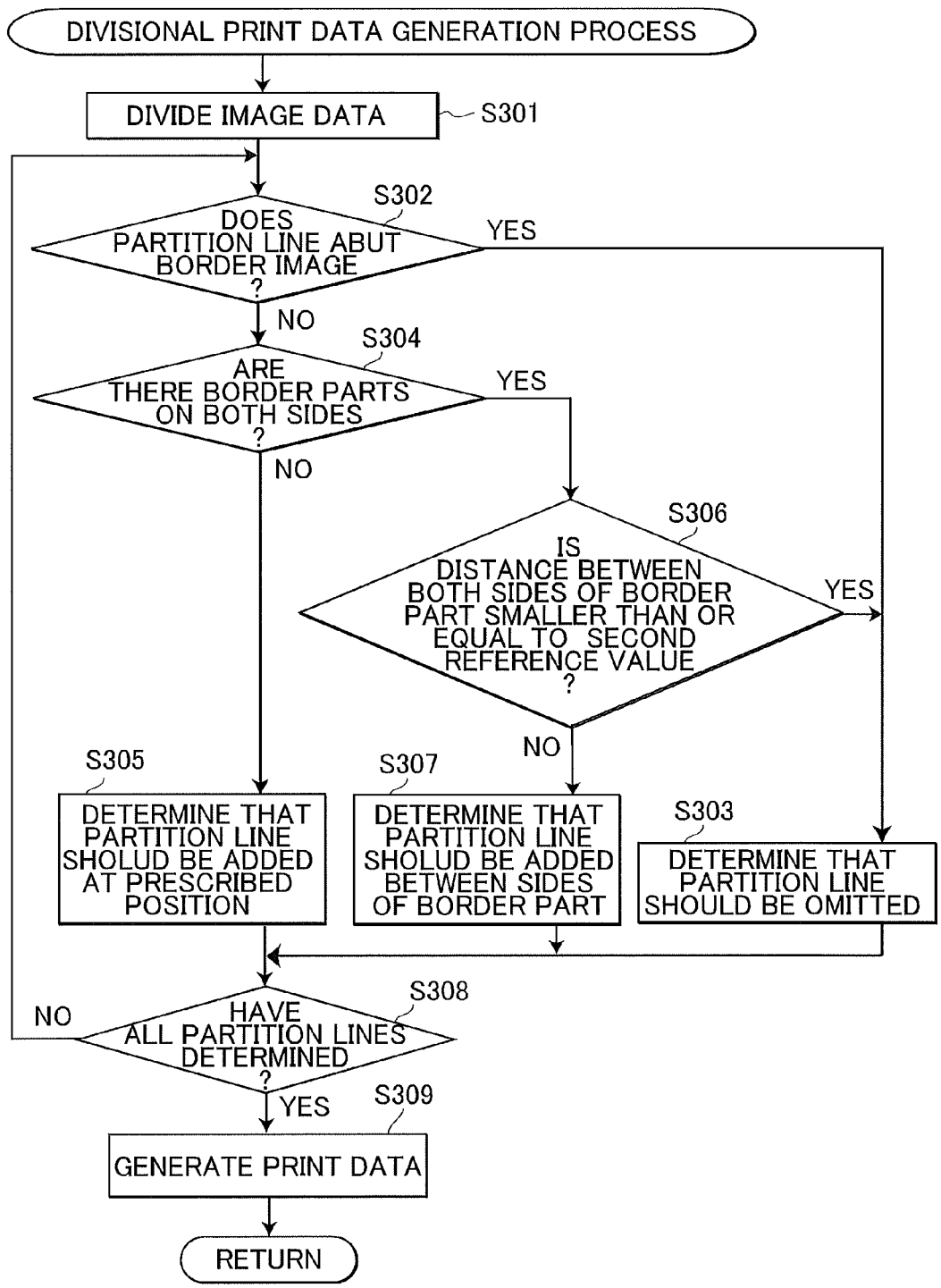
FIG. 6 is a flowchart illustrating steps in a divisional print data according to a second embodiment.

After dividing the original image data in S301 at the beginning of the divisional print data generation process of FIG. 6, in S302 the CPU 21 determines for one partition line disposed at a prescribed position whether or not the partition line abuts a border image. If the CPU 21 determines that the partition line abuts a border image (S302: YES), in S303 the CPU 21 makes a determination to omit the partition line. However, if the partition line does not abut a border image (S302: NO), in S304 the CPU 21 determines whether or not there exist border parts on both sides of this partition line on the same border side. In other words, the CPU 21 determines in S304 whether or not the partition line is located between two border line segments that are located on the border side and abuts the colorant area.

If border parts are not present on both sides of the partition line (S304: NO), in S305 the CPU 21 makes a determination to provide the partition line. However, if there do exist border parts on both sides of the partition line (S304: YES), then in S306 the CPU 21 determines whether or not the distance between both border parts falls within a second reference value. In other words, the CPU 21 determines in S306 whether or not a distance between the two border line segments is greater than or equal to the second prescribed reference value based on the divisional image data. If the distance is within the second reference value (S306: YES), in S303 the CPU 21 makes a determination to omit the partition line. However, if the distance between the border parts is greater than the second reference value (S306: NO), in S307 the CPU 21 makes a determination to omit the partition line at the prescribed position and to add a new partition line between the two border parts (two border line segments). After performing the same determination for each partition line at the specified positions and completing the determination for the final partition line (S308: NO), in S309 the CPU 21 generates print data based on the results of these determinations.

Figure 7:
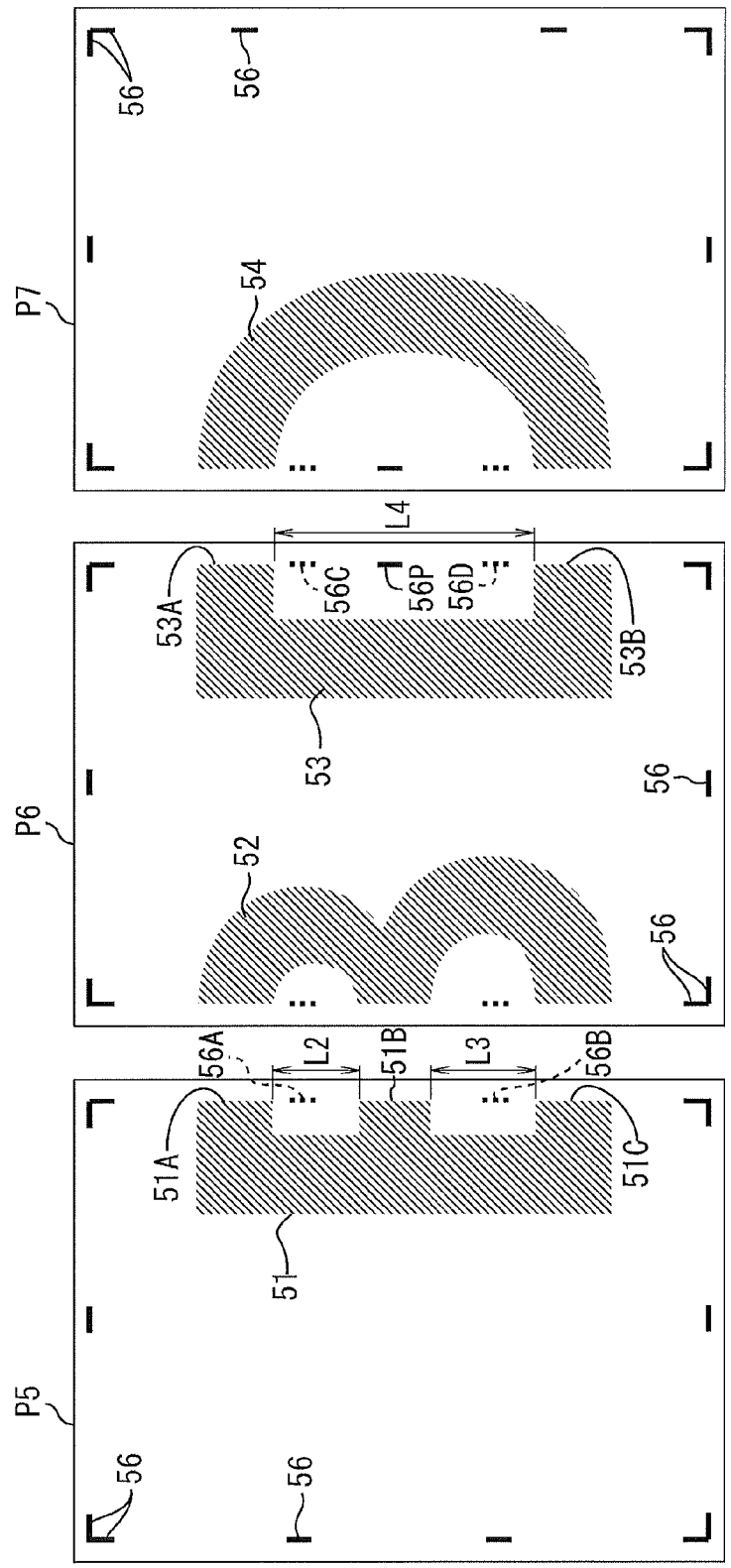
FIG. 7 is an explanatory diagram showing a plurality of print images printed by the printing device in the second embodiment.

FIG. 7 shows a sample printing operation for sheets P5-P7. In this example, four border images 51, 52, 53, and 54 are printed on the sheets P5-P7. Along the long border sides in this example, partition lines 56 assigned to specific positions (i.e., positions that do not abut border images) are arranged at both ends of the long border side, and at two positions spaced at equal intervals between these ends. Two partition lines 56A and 56B on the right border side of sheet P5 are vertically interposed between border parts 51A and 51B and border parts 51B and 51C of the border image 51, respectively. Since the distances L2 and L3 between these pairs of adjacent border parts (51A and 51B, and 51B and 51C) are smaller than the second reference value, the partition lines 56A and 56B are omitted.

In other words, since border parts (51A and 51B, and 51B and 51C) are present on both sides of these partition lines 56A and 56B along the right border side, the user can easily discern the position of the right border side without the partition lines 56A and 56B. The position of this border side is particularly easy to discern since the distances L2 and L3 between adjacent border parts (the 51A and 51B, and the 51B and 51C) are relatively small and it is a simple matter to lay a ruler along these border parts, for example.

Sheet P6 also has two partition lines 56C and 56D arranged at equal intervals along the right border side between the top and bottom edges, and these partition lines are also omitted due to the presence of border parts (border line segment) 53A and 53B of the border image 53 positioned above and below the partition lines 56C and 56D. However, in this case, a new partition line 56P is added between the border parts 53A and 53B because a distance L4 between the border parts 53A and 53B is greater than the second reference value. Here, a single new partition line may be disposed at a center position between the two border parts, or one or a plurality of partition lines may be arranged at fixed intervals from one of the border parts.

In this example, the user may have slight difficulty perceiving the position of the border side if all partition lines between the border parts 53A and 53B were eliminated, since the distance L4 between the border parts 53A and 53B is relatively great. There is also a possibility that the user's ruler will be too short to span between the border parts 53A and 53B. However, by adding the partition line 56P between the border parts 53A and 53B, as shown in this example, the position of the border side becomes easy to perceive. Further, even a short ruler will span between the border part 53A and partition line 56P and the border part 53B and partition line 56P.

It is also possible to provide the partition lines at the specified positions, rather than omitting them, when border parts are present on both sides of the partition lines and the distance between the border parts exceeds the second reference value. However, in the second embodiment, the partition line at the specified position is omitted in this case while one or more partition parts are provided at different positions. Thus, the number and positions of partition lines can be adjusted in the second embodiment based on the positions of the border parts. Accordingly, it is possible to reduce the number of partition lines provided in the printed material based on the positions and sizes of border parts, thereby improving the appearance of the printed material. It is also possible to move partition lines to positions a suitable distance from the border parts in order that the user can more readily perceive the positions of the border sides.

Further, when the CPU 21 determines in S302 of the process shown in FIG. 6 that a partition line does not abut a border image (S302: NO), the CPU 21 may be configured to determine whether the distance between the partition line and a border part of the border image is within the first reference value. If the distance falls within the first reference value, then the CPU 21 may determine that the partition line should be omitted, as in S303 of FIG. 6.

In the second embodiment described above, the partition lines 56 positioned on both ends of each border side are provided as long as the partition lines do not abut a border image. Accordingly, the user can readily discern the positions of corners defining the printing region from the partition lines provided in corners at positions that do not abut a border image.

With the second embodiment described above, it is expected that a user can easily discern the position of a border side, without partition lines, when border parts of border images are present on both sides of the partition lines along the same border side. Therefore, omitting these partition lines can reduce the adverse effects such partition lines have on the appearance of the printed result.

It is also possible that the position of a border side may be difficult to perceive when a partition line interposed between a pair of border parts is omitted, if the distance between the pair of border parts is great. Hence, by adding a new partition line between border parts when the distance between the border parts is greater than a reference value, the user can more readily perceive the position of the border side.

The print controlling system according to the second embodiment can reduce the adverse effects of partition lines on appearance by omitting partition lines that abut border images. Further, the system can help the user perceive the position of a border side by adding partition lines at positions not abutting border images.

Figure 8:
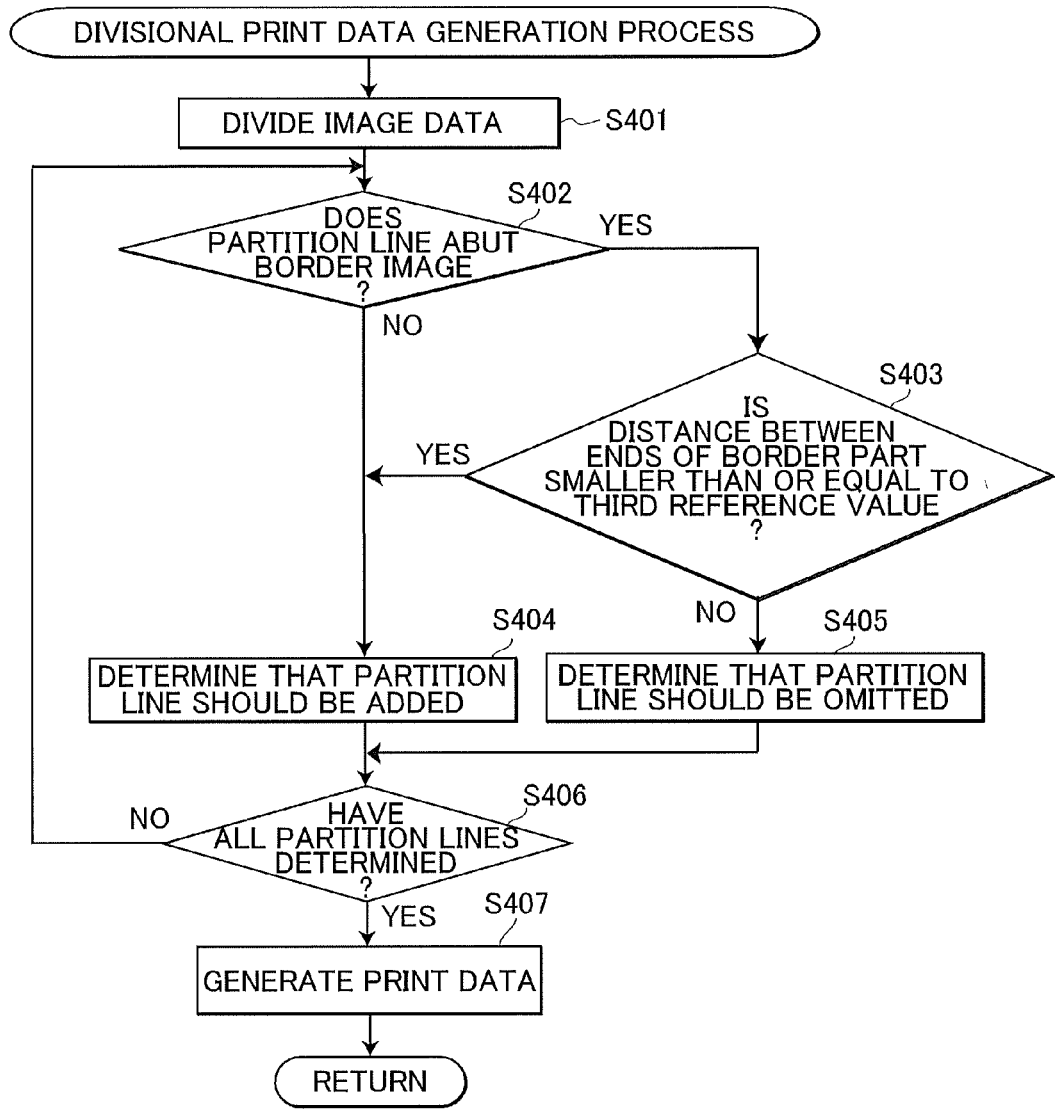
FIG. 8 is a flowchart illustrating steps in a divisional print data according to a third embodiment.

Next, a third embodiment of the present invention will be described with reference to FIGS. 8 and 9. After the CPU 21 divides the original image data in S401 at the beginning of the divisional print data generation process, in S402 the CPU 21 determines for one partition line whether or not the partition line abuts a border image. If the partition line abuts a border image (S402: YES), in S403 the CPU 21 determines whether the distance along the same border side as the partition line between outer ends of border parts present on this border side is within a prescribed third reference value.

When there is only one border part on the border side, the distance between ends of the border part is simply the length of the border part along the border side. When there is a plurality of border parts on the border side, the distance is the length from the outer end of a border part on one end of the border side and the outer end of a border part on the other end of the border side. In the example of FIG. 9, a sheet P8 has a border image 60 with a border part 60A on the left side. A partition line 62A of partition lines 62 abuts the border part 60A of the border image 60. The border part 60A has a length L5, which is the distance between each end of the border part 60A. The sheet P8 also has a border image 61 with two border parts 61A and 61B on the right border side. A partition line 62B abuts the border part 61B of the border image 61. Here, the distance between ends of the border parts is a length L6, which is the distance from the outer edge of the border part 61A to the outer edge of the border part 61B.

If the CPU 21 determines that the distance between ends of the border parts falls within the third reference value (S403:

YES) or that the partition line does not abut a border image (S402: NO), in S404 the CPU 21 determines that the partition line should be provided. However, if the CPU 21 determines that the distance between ends of the border parts is greater than the third reference value (S403: NO), in S405 the CPU 21 determines that the partition line should be omitted. After performing the same determination for each partition line at the specified positions and completing the determination for the final partition line (S406: NO), in S407 the CPU 21 generates print data based on the results of these determinations.

Figure 9:
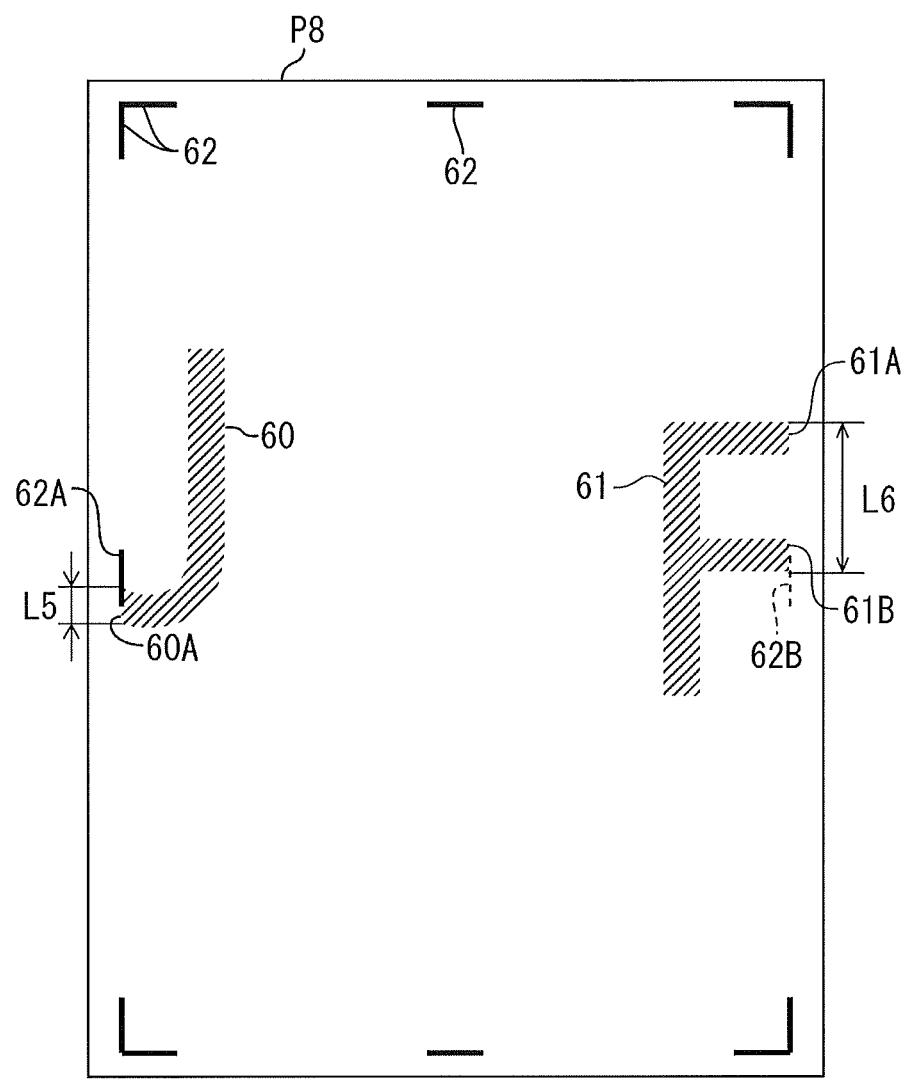
FIG. 9 is an explanatory diagram showing a plurality of print images printed by the printing device in the third embodiment.

In the example shown in FIG. 9, since the length L5 between ends of the border part 60A along the left side of print image of the sheet P8 falls within the third reference value, the CPU 21 provides the partition line 62A. In other words, when the distance between ends of border parts is relatively small, it may be difficult for the user to discern the position of the border side without providing the partition line. Further, it may be difficult to lay a ruler, sheet edge, or other straightedge along the border side with accuracy when aligning the straightedge with the border part. Accordingly, the partition line is provided in this case in order that the user can better perceive the position of the border side.

However, since the length L6 between the ends of the border parts 61A and 61B on the right side of the print image of the sheet P8 is greater than the third reference value, the partition line 62B is omitted from its position abutting the border part 61B. In this case, the distance between ends of the border parts is sufficiently large for the user to discern the position of the border side easily, even when the partition line is omitted.

According to the third embodiment described above, it is expected that the user may have difficulty discerning the position of a border side with accuracy when the distance between outer ends of border parts along the border side is relatively short. Therefore, the partition line is not omitted in this case in order that the user can more easily discern the position of the border side.

In the third embodiment described above, the CPU 21 determines whether the distance between outer ends of border parts falls within the third reference value only when the partition line abuts a border image. However, the CPU 21 may make the same determination when the distance between border parts is within the first reference value, even when the partition line does not abut a border image, and may determine whether to provide or omit the partition line based on the results of this determination.

Figure 10:
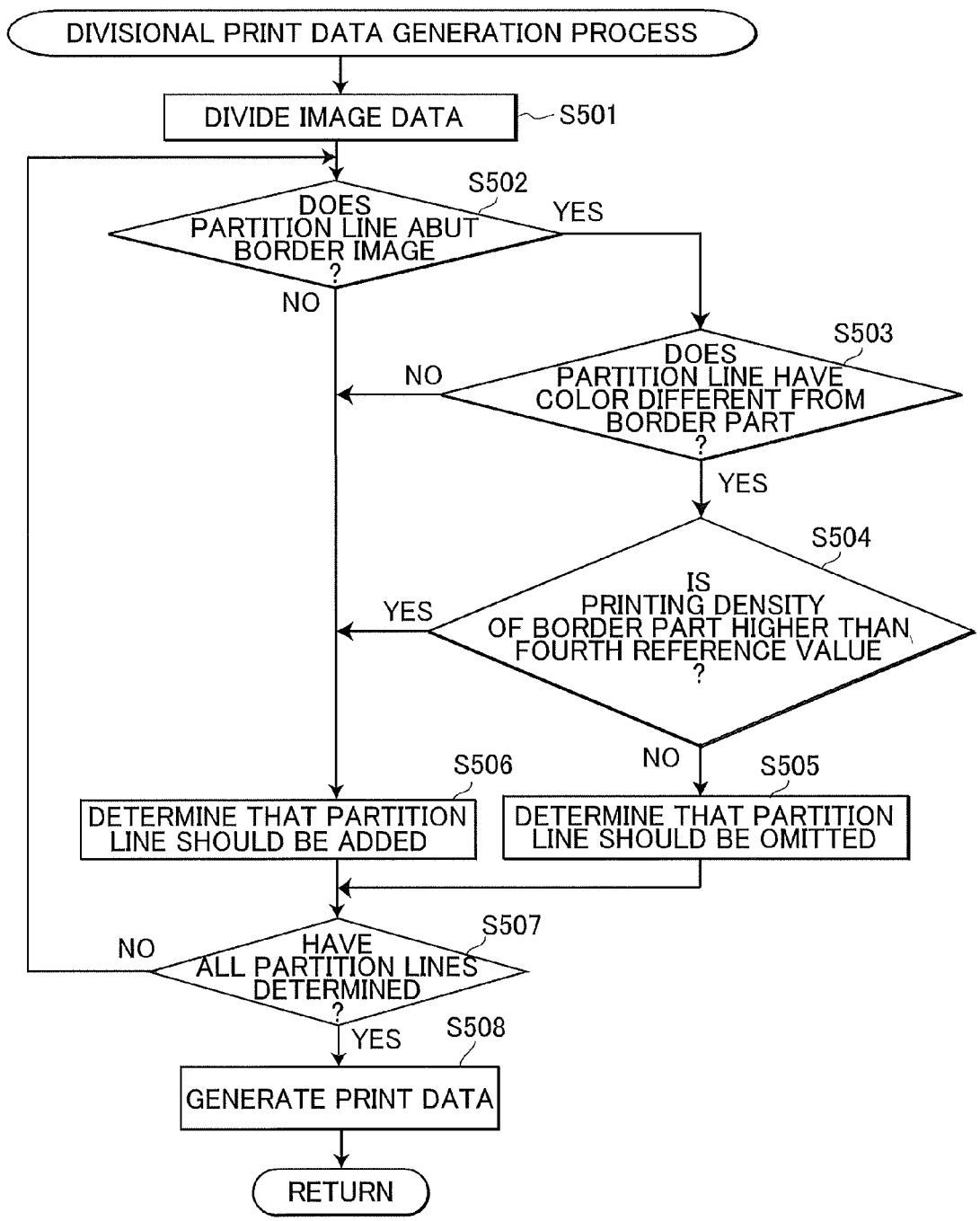
FIG. 10 is a flowchart illustrating steps in a divisional print data according to a fourth embodiment.

Next, a fourth embodiment of the present invention will be described with reference to FIGS. 10 and 11. After the CPU 21 divides the original image data in S501 at the beginning of the divisional print data generation process shown in FIG. 10, in S502 the CPU 21 determines for one partition line whether the partition line abuts a border image. If the partition line abuts a border image (S502: YES), in S503 the CPU 21 determines whether the partition line has a different color than the border part of the border image. If the partition line has a different color than the border part (S503: YES), then in S504 the CPU 21 determines whether the printing density of the border part (and specifically the largest density among the pixels constituting the border part) is greater than a prescribed fourth reference value.

If the printing density of the border part is greater than the fourth reference value (S504: YES), in S505 the CPU 21 makes a determination to omit the partition line. In other words, the CPU 21 determines a density of each portion of the divisional image abutting the border side based on the divisional image data and sets, as at least part of the colorant area, the portion having a density greater than or equal to the fourth reference density and determines whether or not the colorant area abuts the at least one border side in S504.

However, if the partition line does not abut a border image (S502: NO), if the partition line has the same color as the border part (S503: NO), or if the density of the border part is no greater than the fourth reference value (S504: NO), then in S506 the CPU 21 makes a determination to provide the partition line. After performing the same determinations for each partition line at the specified positions and completing the determinations for the final partition line (S507: NO), in S508 the CPU 21 generates print data based on the results of these determinations.

Figure 11:
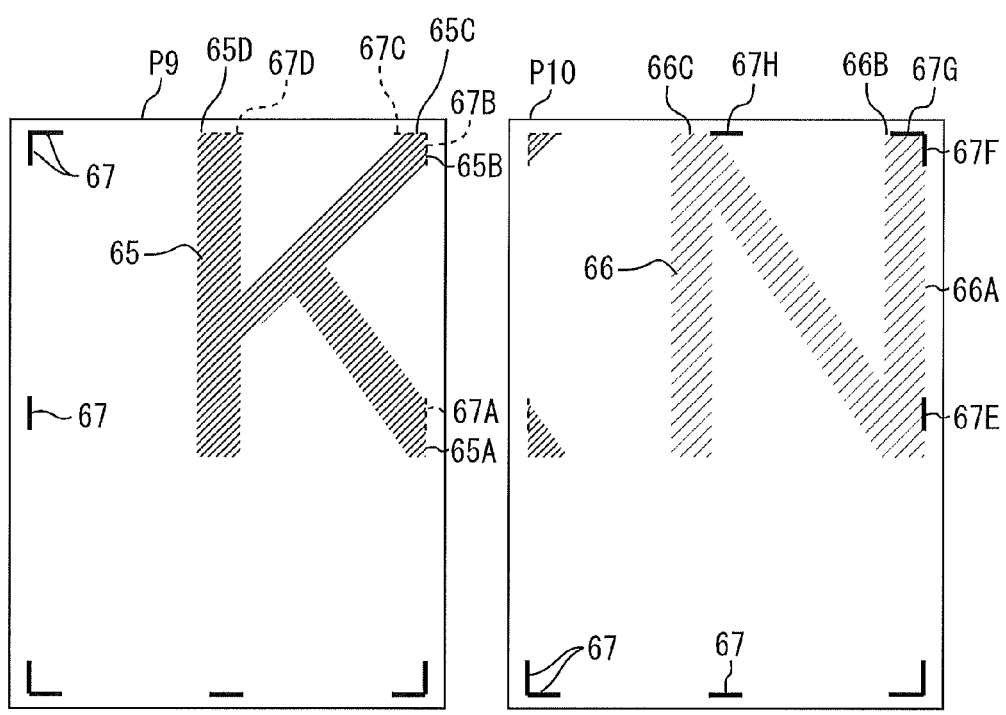
FIG. 11 is an explanatory diagram showing a plurality of print images printed by the printing device in the fourth embodiment.

FIG. 11 shows a sample printing operation for sheets P9 and P10. On sheet P9, a border image 65 is to be printed in blue, and partition lines 67 are to be printed in black. Further, border parts 65A-65D of the border image 65 have a printing density greater than the fourth reference value. Therefore, partition lines 67A-67D abutting this border image are omitted from sheet P9. However, since the user can easily distinguish the border parts 65A-65D of the border image 65, the user can easily discern the positions of border sides, even though the border parts 65A-65D have been omitted.

On sheet P10, a border image 66 is to be printed in light red, while the partition lines 67 are to be printed in black. Further, border parts 66A-66C of the border image 66 have a printing density lower than the fourth reference value. Accordingly, partition lines 67E-67H abutting this border image 66 are included on sheet P10. That is, border parts of the border image having a printing density lower than the fourth reference value are not considered part of the border image and, hence, any partition lines that abut these border parts are not omitted from the printing operation. By providing the partition lines 67E-67H, the user can better discern the positions of the border sides when the border image 66 is formed in a light color that makes it difficult to distinguish positions of the border parts.

In the fourth embodiment described above, it is recognized that the user may have difficulty discerning the positions of border sides, even when a border image is present, if the density of colorant used in the portions of the border image abutting the border sides is low. Accordingly, by not treating portions of a border image having a density of colorant less than a reference value as a border image, essential partition lines are not omitted, enabling the user to discern the position side more easily. Further, partition lines may also be added when the border parts have the same color as the partition lines, since these partition lines do not adversely affect appearance.

In the fourth embodiment, it is assumed that the density of a border image is fixed. However, when the color or density of a border image varies from part to part (pixel to pixel), as in a photograph, the CPU 21 may be configured to determine positions for providing partition lines by treating only portions (pixels) of border parts having a printing density greater than the fourth reference value as border parts, while treating portions (pixels) whose printing density is less than or equal to the fourth reference value as not part of the border image.

Next, a fifth embodiment of the present invention will be described with reference to FIGS. 12 and 13. In the fourth embodiments described above, the CPU 21 determines in the divisional print data generation process whether or not to provide each of the partition lines at the specified positions. However, in the process according to the fifth embodiment, the CPU 21 determines the positions for providing partition lines based on the positions of border images.

Figure 12:
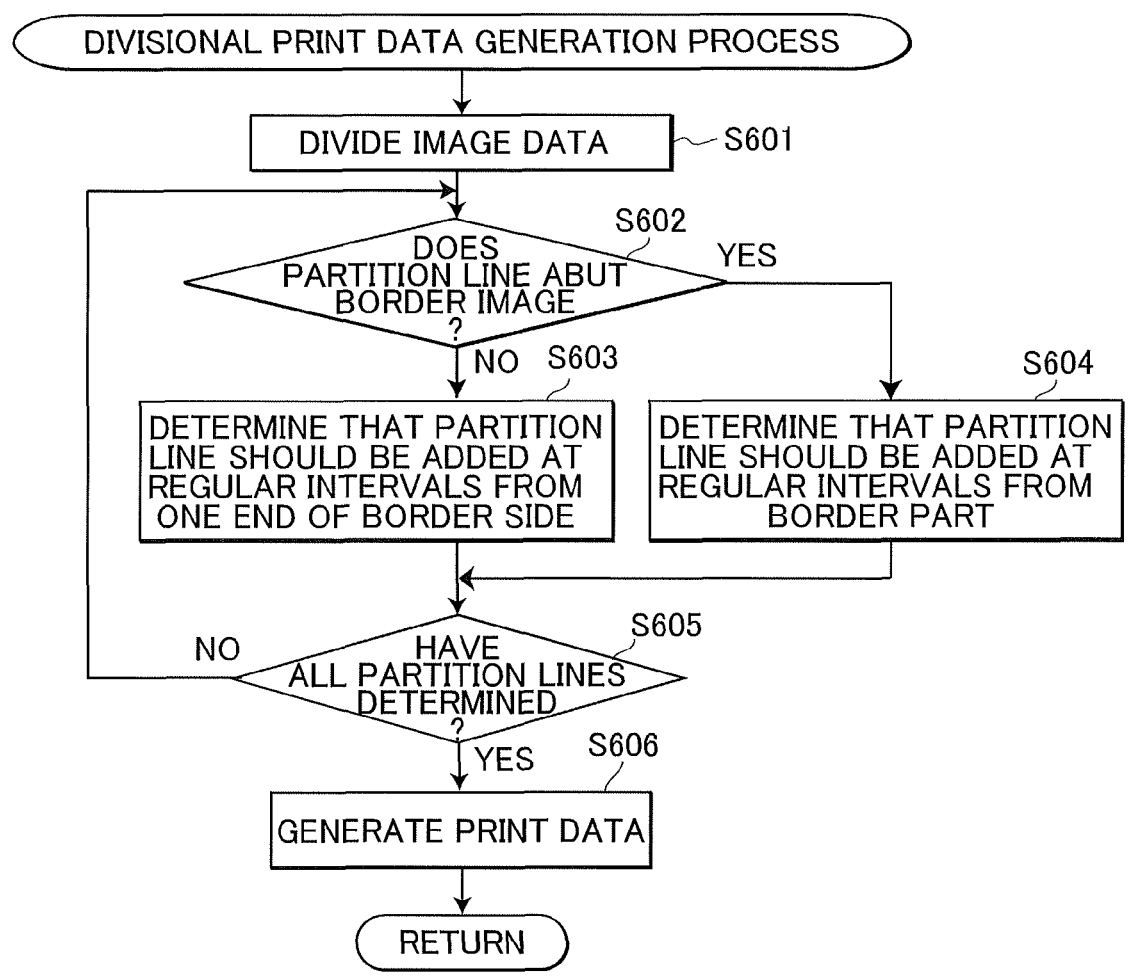
FIG. 12 is a flowchart illustrating steps in a divisional print data according to a fifth embodiment.

After the CPU 21 divides the image data in S601 at the beginning of the divisional print data generation process shown in FIG. 12, in S602 the CPU 21 determines for one border side whether the border side abuts a border image. If the border side does not abut a border image (S602: NO), in S603 the CPU 21 makes a determination to provide partition lines at regular intervals along the border side, beginning from one end thereof. However, if the border side does abut a border image (S602: YES), in S604 the CPU 21 makes the determination to omit the partition lines at prescribed position and to provide partition lines at fixed intervals from the border part of the border image.

In S605 the CPU 21 determines if there are any border sides for which the above determinations were not performed. If there remain any unprocessed border sides (S605: YES), the CPU 21 returns to S602 and determines positions for providing partition lines for the next border side. After completing the above determinations for all border sides (S605: NO), in S606 the CPU 21 generates print data including partition lines provided according to the above determinations, and subsequently ends the divisional print data generation process.

Figure 13:
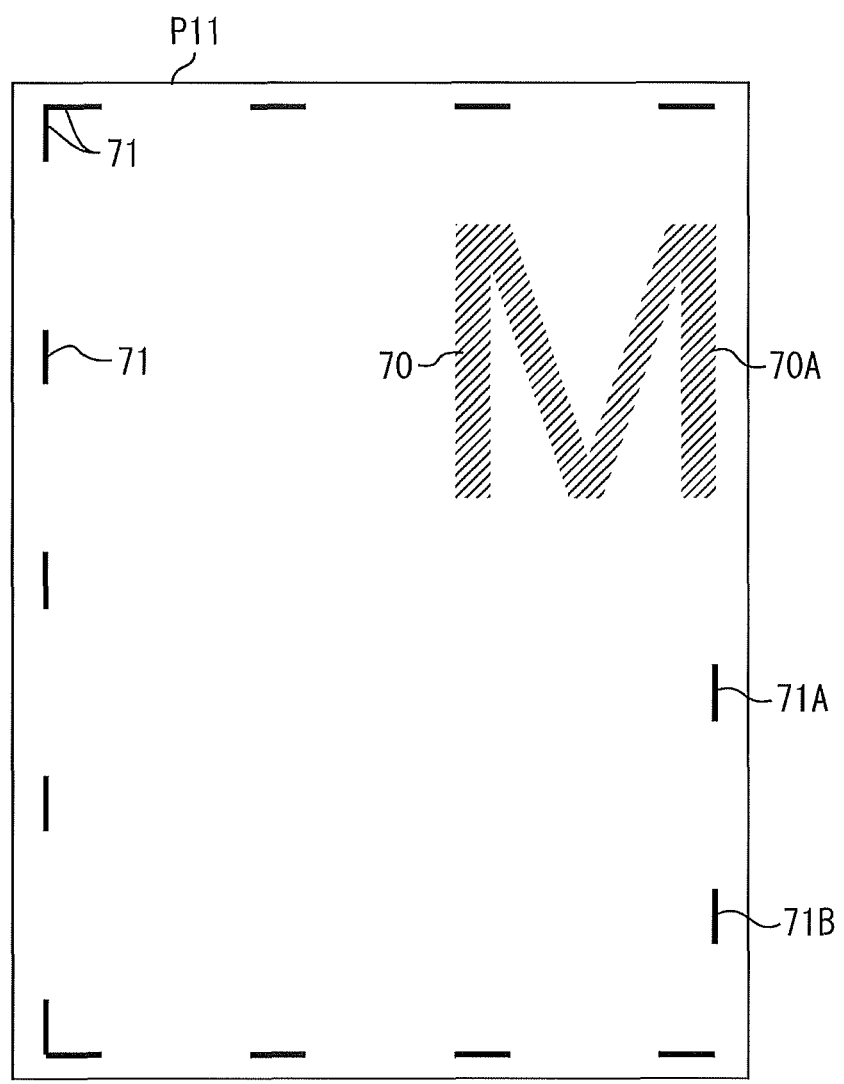
FIG. 13 an explanatory diagram showing a plurality of print images printed by the printing device in the fifth embodiment.

FIG. 13 shows a sample printing operation according to the above process for a sheet P11. In this example, partition lines 71 are provided at fixed intervals along the left border side of the printed image, beginning from one end thereof, because the left border side does not abut a border image. In contrast, since the right border side does abut a border image 70, partition lines 71A and 71B are provided at fixed intervals from a border part 70A of the border image 70.

The process described above omits partition lines at positions abutting a border image and at positions near the border part of the border image. The process also adds new partition lines at positions not abutting a border image. In other words, when the CPU 21 modifies the divisional image data such that the partition line segment is omitted at a position that the partition line segment abuts the colorant area, the CPU 21 further modifies the divisional image data such that a new partition line segment is printed outside of the colorant area on the border side in the print image.

By setting the positions at which partition lines are provided based on the position of the border images, the partition lines can be arranged more efficiently. Hence, this process ensures that the user can easily perceive the border sides, while decreasing the number of partition lines to reduce the adverse effects of these partition lines on the appearance of the image.

While the invention has been described in detail with reference to the first through fifth embodiments thereof, it would be apparent to those skilled in the art that various changes and modifications may be made therein without departing from the spirit of the invention.

(1) In the first through fifth embodiments described above, the process for providing and omitting partition lines is performed by a computer, and the printing process is performed by a printer, but the present invention may be applied to a system in which the process for providing and omitting partition lines is performed on the printer. For example, when the printer 10 receives the divisional image data from the computer 20, the CPU 11 of the printer 10 performs a process to provide and omit partition lines in the print data, and subsequently the printing unit 16 prints the resulting data.

A printing device may also be configured to perform a process to provide and omit partition lines in the print images based on the divisional image data or the original image data acquired from an image-reading unit that scans an original or image data received through facsimile communications, for example, and to subsequently print the resulting data.

(2) The conditions described in the first through fifth embodiments for determining whether to provide or omit partition lines or for determining the positions to add partition lines may be suitably modified within the scope of the invention. For example, steps in the processes described in the flowcharts may be omitted or combined to partially modify the conditions. As a specific example, the determination condition in S504 of FIG. 10 based on the printing density of the border parts may be included in the flowcharts of FIGS. 3, 6, 8, and 12.

It is also possible to omit all partition lines along a border side when a border image abuts the border side, or to omit all partition lines along a border side only when a prescribed condition is met, such as when the length of the border part is at least a prescribed length or when the distances from both ends of the border side to the border part are within a prescribed reference value.

(3) In the first through fifth embodiments, one sheet has four border sides. However, the present invention may also be applied to sheets having one, two, or three border sides, for example.

(4) In the first through fifth embodiments, each partition line is either included or excluded in its entirety. However, the present invention may be applied to a configuration that includes or excludes only a portion of the partition line based on its original size. Taking the example of FIG. 9, since only part of the partition line 62A abuts the border part 60A, it is possible to omit only this part of the partition line 62A.

(5) Partition lines according to the scope of the present invention include those lines that are not printed precisely along the border sides, but are printed at positions slightly offset from the border sides. Further, the partition lines may be continuous or broken.

(6) When a thin line having a thickness approaching a minimum number of pixels abuts the border side, the inclusion or exclusion of partition lines may be determined by not treating the thin line as a border image when the printing resolution is higher than a reference value, because the line will be difficult to see, and by treating the thin line as a border image when the printing resolution is within the reference value, because the line will have a sufficient degree of thickness to be visible.

(7) In the described above embodiments and modifications, the controller (CPU 21) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section, or a plurality of separate dedicated or programmable integrated or other electronic circuits or devices (e.g., hardwired electronic or logic circuits such as discrete element circuits, or programmable logic devices such as PLDs PLAs, PALs or the like). The controller can be implemented using a suitably programmed general purpose controller, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 2, 3, 6, 8, 10 and 12 can be used as the controller. A distributed processing architecture can be used for maximum data/signal processing capability and speed.

What is claimed is:

1. A print controlling device comprising:
an acquiring unit that is configured to acquire original image data representing an original image, the original image having a size larger than a size of a recording sheet;
a dividing unit that is configured to divide the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by a printing device;
a first determining unit that is configured to determine, if the colorant area abuts a border side of the at least one border side, whether or not a partition line segment of the at least one partition line segment abuts the colorant area in the divisional image based on the divisional image data; and
a print data generating unit that is configured to generate print data by modifying each set of divisional image data, the print data representing a print image that is to be printed on the recording sheet by the printing device;
wherein the print data generating unit modifies, when the first determining unit determines that the partition line segment abuts the colorant area, the divisional image data such that at least part of the partition line segment is omitted in the print image, and
wherein the print data generating unit modifies, if the colorant area does not abut a border side of the at least one border side, the divisional image data such that the at least one partition line segment is printed on the border side in the print image.

2. The print controlling device according to claim 1, wherein when the first determining unit determines that the partition line segment does not abut the colorant area on the border side, the print data generating unit modifies the divisional image data such that at least part of the partition line segment is omitted on the border side in the print image.

3. The print controlling device according to claim 2, further comprising a second determining unit that is configured to determine, when the first determining unit determines that the partition line segment does not abut the colorant area on the border side, whether or not a first distance between the partition line segment and the colorant area in the divisional image is smaller than or equal to a first prescribed value based on the divisional image data;
wherein when the second determining unit determines that the first distance is smaller than or equal to the first prescribed value, the print data generating unit modifies the divisional image data such that at least part of the partition line segment is omitted in the print image.

4. The print controlling device according to claim 1, further comprising a third determining unit that is configured to determine whether or not the partition line segment is located between two border line segments, each border line segment being located on the border side and abutting the colorant area;
wherein when the third determining unit determines that the partition line segment is located between the two border line segments, the print data generating unit modifies the divisional image data such that the partition line segment is omitted in the print image.

5. The print controlling device according to claim 4, further comprising a fourth determining unit that is configured to determine, when the third determining unit determines that the partition line segments is located between the two border line segments, whether or not a second distance between the two border line segments is greater than or equal to a second prescribed value based on the divisional image data,
wherein when the fourth determining unit determines that the second distance is greater than or equal to the second prescribed value, the print data generating unit modifies the divisional image data such that a new partition line segment is printed between the two border line segments in the print image.

6. The print controlling device according to claim 1, further comprising a fifth determining unit that is configured to determine, if the divisional image data representing the divisional image including a border part that is at a part of the colorant area and abuts the border side, whether or not a third distance between one end and another end of the border part is smaller than or equal to a third prescribed value based on the divisional image data,
wherein when the fifth determining unit determines that the third distance is smaller than or equal to the third prescribed value, the print data generating unit modifies the divisional image data such that the partition line segment is printed in the print image.

7. The print controlling device according to claim 1, wherein the print data generating unit further modifies, when the print data generating unit modifies the divisional image data such that the partition line segment is omitted at a position that the partition line segment abuts the colorant area, the divisional image data such that a new partition line segment is printed outside of the colorant area on the border side in the print image.

8. The print controlling device according to claim 1, further comprising a sixth determining unit that is configured to determine, when the first determining unit determines that the partition line segment abuts the colorant area, whether or not a color of the partition line segment is different from a color of border part, the border part being a part of the colorant area and abutting the border side, and
wherein when the sixth determining unit determines that the color of the partition line segment is different from the color of the border part, the print data generating unit modifies the divisional image data such that the partition line segment is omitted in the print image.

9. The print controlling device according to claim 1, further comprising:
a density determining unit that is configured to determine a density of each portion of the divisional image that abuts the border side based on the divisional image data, and
a colorant area setting unit that is configured to set, as at least part of the colorant area, the portion having a density greater than or equal to a prescribed density;
wherein the first determining unit determines whether or not the colorant area set by the colorant area setting unit abuts the at least one border side.

10. The print controlling device according to claim 1, further comprising the printing device.

11. A method executed by a print controlling device, the method comprising:

acquiring original image data representing an original image, the original image having a size larger than a size of a recording sheet;

dividing the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by a printing device;

determining, when the colorant area abuts a border side of the at least one border side, whether or not a partition line segment of the at least one partition line segment abuts the colorant area in the divisional image based on the divisional image data; and generating print data by modifying each set of divisional image data, the print data representing a print image that is to be printed on the recording sheet by the printing device, wherein when the partition line segment abuts the colorant area, the generating modifies the divisional image data such that at least part of the partition line segment is omitted in the print image, and wherein when the colorant area does not abut a border side of the at least one border side, the generating modifies the divisional image data such that the at least one partition line segment is printed on the border side in the print image.

12. A non-transitory computer readable storage medium storing a set of program instructions installed on and executed by a computer for controlling a print controlling device, the program instructions comprising:

acquiring original image data representing an original image, the original image having a size larger than a size of a recording sheet;

dividing the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by a printing device;

determining, when the colorant area abuts a border side of the at least one border side, whether or not a partition line segment of the at least one partition line segment abuts the colorant area in the divisional image based on the divisional image data; and generating print data by modifying each set of divisional image data, the print data representing a print image that is to be printed on the recording sheet by the printing device, wherein when the partition line segment abuts the colorant area, the generating modifies the divisional image data such that at least part of the partition line segment is omitted in the print image, and wherein when the colorant area does not abut a border side of the at least one border side, the generating modifies the divisional image data such that the at least one partition line segment is printed on the border side in the print image.

13. A print controlling system comprising:

a printing device that is configured to print an print image on a recording sheet;

a print controlling device including:

an acquiring unit that is configured to acquire original image data representing an original image, the original image having a size larger than a size of the recording sheet;

a dividing unit that is configured to divide the original image data into a plurality of sets of divisional image data, the plurality of sets of divisional image data representing a plurality of divisional images, each divisional image having a size same as the size of recording sheet, each divisional image including an image region and a margin region that is different from the image region, at least one border side being defined as a border between the image region and the margin region, each border side having at least one partition line segments, the image region representing a part of original image, the original image consisting of the image regions of the plurality divisional images, the image region having a colorant area and a blank area that is different from the colorant area, the colorant area being to be printed with a colorant by the printing device;

wherein one of the printing device and the print controlling unit further includes:

a first determining unit that is configured to determine, if the colorant area abuts a border side of the at least one border side, whether or not a partition line segment of the at least one partition line segment abuts the colorant area in the divisional image based on the divisional image data; and a print data generating unit that is configured to generate print data by modifying each set of divisional image data, the print data representing a print image that is to be printed on the recording sheet by the printing device;

wherein the print data generating unit modifies, when the first determining unit determines that the partition line segment abuts the colorant area, the divisional image data such that at least part of the partition line segment is omitted in the print image, wherein the print data generating unit modifies, if the colorant area does not abut a border side of the at least one border side, the divisional image data such that the at least one partition line segment is printed on the border side in the print image, and wherein the printing device prints the print image based on the print data.

* * * * *

UNITED STATES PATENT AND TRADEMARK OFFICE
CERTIFICATE OF CORRECTION

| | | |
|---|---|---|
| PATENT NO. | : 8,582,169 B2 | |
| APPLICATION NO. | : 13/024410 | |
| DATED | : November 12, 2013 | |
| INVENTOR(S) | : Kenichi Watanabe | |

It is certified that error appears in the above-identified patent and that said Letters Patent is hereby corrected as shown below:

In the Claims

Column 15, Claim 1, Line 11:
   Please delete "of recording" and insert --of the recording--

Column 15, Claim 1, Line 16:
   Please delete "line segments," and insert --line segment,--

Column 15, Claim 1, Line 17:
   Please delete "of original" and insert --of the original--

Column 15, Claim 1, Line 21:
   Please delete "being to be printed" and insert --being printed--

Column 15, Claim 3, Line 53:
   Please delete "a first distance" and insert --a distance--

Column 15, Claim 3, Line 55:
   Please delete "a first prescribed" and insert --a prescribed--

Column 15, Claim 3, Line 58:
   Please delete "the first distance" and insert --the distance--

Column 15, Claim 3, Line 58:
   Please delete "equal to the first" and insert --equal to the--

Column 15, Claim 4, Line 63:
   Please delete "a third determining" and insert --a second determining--

Signed and Sealed this
Eighteenth Day of February, 2014

Michelle K. Lee
*Deputy Director of the United States Patent and Trademark Office*

CERTIFICATE OF CORRECTION (continued)
U.S. Pat. No. 8,582,169 B2

Column 16, Claim 4, Line 1:
   Please delete "the third determining" and insert --the second determining--

Column 16, Claim 5, Line 7:
   Please delete "a fourth determining" and insert --a third determining--

Column 16, Claim 5, Line 8:
   Please delete "the third determining" and insert --the second determining--

Column 16, Claim 5, Line 9:
   Please delete "line segments is" and insert --line segment is--

Column 16, Claim 5, Line 10:
   Please delete "a second distance" and insert --a distance--

Column 16, Claim 5, Line 11:
   Please delete "equal to a second" and insert --equal to a--

Column 16, Claim 5, Line 13:
   Please delete "the fourth determining" and insert --the third determining--

Column 16, Claim 5, Line 14:
   Please delete "the second distance" and insert --the distance--

Column 16, Claim 5, Line 14:
   Please delete "equal to the second" and insert --equal to the--

Column 16, Claim 6, Line 21:
   Please delete "a fifth determining" and insert --a second determining--

Column 16, Claim 6, Line 24:
   Please delete "a third distance" and insert --a distance--

Column 16, Claim 6, Line 26:
   Please delete "a third prescribed" and insert --a prescribed--

Column 16, Claim 6, Line 28:
   Please delete "the fifth determining" and insert --the second determining--

Column 16, Claim 6, Line 29:
   Please delete "the third distance" and insert --the distance--

Column 16, Claim 6, Line 29:
   Please delete "equal to the third" and insert --equal to the--

CERTIFICATE OF CORRECTION (continued)
U.S. Pat. No. 8,582,169 B2

Column 16, Claim 8, Line 42:
   Please delete "a sixth determining" and insert --a second determining--

Column 16, Claim 8, Line 48:
   Please delete "the sixth determining" and insert --the second determining--

Column 16 (Lines 66-67) and Column 17 (Lines 1-36), Claim 11:
   Please delete "A method executed by a print controlling device, the method comprising:
acquiring original image data representing an original image, the original image having a
size larger than a size of a recording sheet;
dividing the original image data into a plurality of sets of divisional image data, the plurality of sets
of divisional image data representing a plurality of divisional images, each divisional image having
a size same as the size of recording sheet, each divisional image including an image region and a
margin region that is different from the image region, at least one border side being defined as a
border between the image region and the margin region, each border side having at least one
partition line segments, the image region representing a part of original image, the original image
consisting of the image regions of the plurality divisional images, the image region having a
colorant area and a blank area that is different from the colorant area, the colorant area being to be
printed with a colorant by a printing device;
determining, when the colorant area abuts a border side of the at least one border side, whether or
not a partition line segment of the at least one partition line segment abuts the colorant area in the
divisional image based on the divisional image data; and
generating print data by modifying each set of divisional image data, the print data representing a
print image that is to be printed on the recording sheet by the printing device, wherein when the
partition line segment abuts the colorant area, the generating modifies the divisional image data
such that at least part of the partition line segment is omitted in the print image, and
wherein when the colorant area does not abut a border side of the at least one border side, the
generating modifies the divisional image data such that the at least one partition line segment is
printed on the border side in the print image."

Column 17, Claim 12, Lines 47-48:
   Please delete "of recording" and insert --of the recording--

Column 17, Claim 11, Line 53:
   Please delete "segments," and insert --segment,--

Column 17, Claim 12, Lines 53-54:
   Please delete "of original" and insert --of the original--

Column 17, Claim 12, Line 58:
   Please delete "to be printed" and insert --printed--

Column 18, Claim 13, Line 15:
   Please delete "print an print" and insert --print a print--

CERTIFICATE OF CORRECTION (continued)
U.S. Pat. No. 8,582,169 B2

Column 18, Claim 13, Lines 26-27:
   Please delete "of recording" and insert --of the recording--

Column 18, Claim 13, Line 32:
   Please delete "line segments," and insert --line segment,--

Column 18, Claim 13, Line 33:
   Please delete "of original" and insert --of the original--

Column 18, Claim 13, Line 37:
   Please delete "being to be printed" and insert --being printed--

Column 18, Claim 13, Line 41:
   Please delete "a first determining" and insert --a determining--

Column 18, Claim 13, Line 53:
   Please delete "first determining" and insert --determining--